United States Patent [19]

Grüning et al.

[11] Patent Number: 5,994,415
[45] Date of Patent: Nov. 30, 1999

[54] COMPOUND ANTIFOAMS FOR DEFOAMING POLYMER DISPERSIONS AND AQUEOUS COATING SYSTEMS

[75] Inventors: Burghard Grüning, Essen; Petra Hinrichs, Bochum; Michael Keup, Essen; Frank König, Gelsenkirchen; Stefan Silber, Krefeld; Roland Sucker, Werne; Ellen Wallhorn, Essen, all of Germany

[73] Assignee: Th. Goldschmidt AG, Essen, Germany

[21] Appl. No.: 09/078,958

[22] Filed: May 14, 1998

[30] Foreign Application Priority Data

May 17, 1997 [DE] Germany .................... 197 20 870

[51] Int. Cl.$^6$ .................................................... B01D 19/04
[52] U.S. Cl. .................... 516/116; 516/133; 524/290; 524/291; 524/320
[58] Field of Search .................... 516/116, 133; 524/290, 291, 320

[56] References Cited

U.S. PATENT DOCUMENTS

| | | | |
|---|---|---|---|
| 4,011,251 | 3/1977 | Tjurin et al. | 554/173 |
| 4,895,681 | 1/1990 | Herrmann et al. | 516/133 |
| 5,071,591 | 12/1991 | Sheridan | 516/133 |
| 5,306,341 | 4/1994 | Ono et al. | 106/287.13 |
| 5,308,634 | 5/1994 | Cooper | 426/531 |
| 5,336,313 | 8/1994 | Bunte et al. | 106/504 |
| 5,429,718 | 7/1995 | Morlino et al. | 516/18 |

FOREIGN PATENT DOCUMENTS

| | | |
|---|---|---|
| 1067003 | 3/1960 | Germany . |
| 1914684 | 12/1970 | Germany . |
| 3636086 A1 | 4/1988 | Germany . |

*Primary Examiner*—Richard D. Lovering
*Assistant Examiner*—Daniel S. Metzmaier
*Attorney, Agent, or Firm*—Frommer Lawrence & Haug LLP

[57] ABSTRACT

The invention relates to compound antifoams comprising alkoxylated partial esters—using from 3 to 60 mol of propylene oxide with or without from 1 to 10 mol of styrene oxide and/or from 1 to 10 mol of butylene oxide—of oligoglycerols, obtainable by condensation of 2 to 20 glycerol molecules, with $C_8$ to $C_{22}$ fatty acids and inorganic or organic solids for defoaming polymer dispersions and aqueous coating systems.

12 Claims, No Drawings

COMPOUND ANTIFOAMS FOR DEFOAMING POLYMER DISPERSIONS AND AQUEOUS COATING SYSTEMS

RELATED APPLICATIONS

This application claims priority to German application No. 197 20 870.3, filed May 17, 1997, herein incorporated by reference.

BACKGROUND OF THE INVENTION

1. Field of the Invention

The invention relates to compound antifoams comprising alkoxylated partial esters of oligoglycerols, obtainable by condensation of 2 to 20 glycerol molecules, with $C_8$ to $C_{22}$ fatty acids and inorganic or organic solids for defoaming polymer dispersions and aqueous coating systems.

2. Description of the Related Art

In many industrial processes, surface-active substances are employed in a targeted manner in order to obtain particular effects. For instance, aqueous coating materials require a range of auxiliaries, examples including emulsifiers to emulsify the water-insoluble binders, or additives to improve substrate wetting and pigment dispersion. An undesirable side effect of these surface-active substances, however, is that they stabilize, in the form of foam, the air introduced in the course of preparation or application.

The use of silicone oils, especially dimethylpolysiloxanes of low to medium viscosity, for defoaming aqueous solutions or dispersions is known and is described, for example, in the book by W. Noll "Chemie und Technologie der Silicone" [Chemistry and Technology of the Silicones]. To improve the defoaming action of organosilicon antifoams and/or those based on mineral oil it is common to add highly disperse inorganic or organic substances, especially silicas produced generally by the pyrogenic method (DE-C-10 67 003, DE-A-19 14 684). The use of polyoxyalkylene-polysiloxane copolymers as antifoams is likewise known (U.S. Pat. No. 3,763,021).

These prior art formulations comprising silicone oils or polyoxyalkylene-polysiloxane copolymers are suitable to a greater or lesser extent for preventing the formation of foam in polymer dispersions or aqueous coating systems or for destroying existing foam. It has been found, however, that aqueous coating systems to which formulations of this kind have been added have disadvantages which are attributable to the addition of these antifoams.

It has been found in particular that high-gloss emulsion paints to which polysiloxanes, polyoxyalkylene-polysiloxane copolymers or formulations based on mineral oil have been added to remove foam, exhibit a variety of wetting defects, and also reduce gloss, when they are applied to surfaces. These defects are manifested in nonuniform wetting of the substrate, and lead to the formation of coatings of irregular thickness and, in extreme cases, to coatings containing defect sites of varying extent.

Moreover, the use of silicone-based products in aqueous coating systems often provokes problems of interlayer adhesion; when used in dipping tanks, it is difficult to avoid the occurrence of craters over a prolonged period; and, in application processes that are followed by catalytic post-combustion, the service life of the catalysts is reduced.

In addition, the use of products based on mineral oil is in many cases inopportune. In addition to the physiological and ecological risks, these carrier oils reduce—in aqueous media, for example—the degree of gloss of emulsion paints or lead, in flexographic printing inks, to unwanted swelling of the flexographic plates.

DE-A-36 36 086 describes fatty acid esters of polyglycerol polyglycol ethers that are obtained by conventional reaction of polyglycerols with ethylene oxide and propylene oxide and by esterifying the resulting alkylene oxide adduct with fatty acids, using from 2 to 15 mol of ethylene oxide, from 10 to 60 mol of propylene oxide and from 1 to 3 mol of fatty acid per mole of hydroxyl groups present in the polyglycerol. In aqueous coating systems, however, the foam prevention properties of these products are inadequate because it is not possible to obtain the necessary long-term action in the paint.

OBJECT OF THE INVENTION

The object on which the present invention is based, therefore, is to discover suitable antifoam formulations which are free from silicone and mineral oil, which exhibit a good defoaming action in polymer dispersions and in aqueous coating systems comprising such dispersions, which retain this effect over a relatively long time, but which at the same time avoid the problems described above.

SUMMARY OF THE INVENTION

This object on which the invention is based is surprisingly achieved by the use of alkoxylated partial esters of oligoglycerols, obtainable by condensation of from 2 to 20 glycerol molecules, with $C_8$ to $C_{22}$ fatty acids, and compound formulations prepared therefrom, using from about 3 to about 60 mol of propylene oxide and preferably from about 1 to about 10 mol of styrene oxide and/or from about 1 to about 10 mol of butylene oxide.

An important feature of these systems when used as antifoams in aqueous coating systems is that one avoids using hydrophilic polyethylene oxide segments and compounding the esters with organic and/or inorganic, preferably hydrophobic solids.

DESCRIPTION OF THE PREFERRED EMBODIMENTS

Partial esters of fatty acids with oligoglycerols obtainable by condensation of from 2 to 20 glycerol molecules are known (DE-C-25 11 807 which corresponds to U.S. Pat. No. 5,336,313). These partial esters are commonly employed as internal lubricants and/or as antistatic polymer additives. Their use as a dispersing additive in aqueous coating dispersions has also been described (EP-B-0 479 819 which corresponds to U.S. Pat. No. 4,011,251).

The partial esters to be employed in accordance with the invention are prepared from an alcohol component comprising oligoglycerols obtainable by condensing from 2 to 20 glycerol molecules, preference being given to oligoglycerols composed formally of from 2 to 10, in particular from 4 to 6, glycerol units in preparing the partial esters. It is also possible to employ technical-grade mixtures of the oligoglycerols having the stated chain lengths. Oligoglycerols obtainable by other methods are also suitable for preparing the partial esters.

To prepare the partial esters that are to be employed in accordance with the invention, such oligoglycerols are partially esterified with $C_8$ to $C_{22}$ fatty acids, leaving preferably one to two hydroxyl groups unmodified in the oligoglycerol moiety. As examples of $C_8$ to $C_{22}$ fatty acids there may be mentioned caprylic, capric, laurylic, myristic, palmitic, stearic, isostearic, oleic, ricinoleic and 12-hydroxystearic acids. Also suitable are dihydroxy acids or dimeric acids. For preparing the partial esters the fatty acids can usually be employed in the form of their technical-grade mixtures.

The partial esters, which still contain free hydroxyl groups, obtainable in this way can be modified by addition reaction with alkylene oxides, such as propylene oxide, styrene oxide and butylene oxide. It is possible to add the various alkylene oxides randomly or in blocks. Particular preference is given to the addition of about 3 to about 60 mol of propylene oxide, especially about 10 to about 30 mol of propylene oxide, and about 1 to about 10 mol of styrene oxide and/or about 1 to about 10 mol of butylene oxide.

The partial esters to be used in accordance with the invention also comprise products obtainable by first alkoxylating the parent oligoglycerol starting materials and then carrying out the esterification with appropriate fatty acids. The reaction conditions for etherification and esterification are those of the prior art. Catalysts suitable for the etherification include both acidic and basic catalysts, with preference to potassium hydroxide, potassium methylate, sodium methylate or $BF_3$ etherate. The use of $BF_3$ etherate is particularly preferred.

One skilled in the art is well aware that the compounds are present in the form of a mixture with a distribution governed essentially by the laws of statistics.

The compound formulations that are to be used in accordance with the invention for defoaming polymer dispersions and aqueous coating systems comprising:

a) about 85.0 to about 99.9 parts by weight of an alkoxylated partial ester of an oligo-glycerol which has esterified with $C_8$ to $C_{22}$ fatty acids, and alkokylated with about 3 to about 60 mol of propylene oxide and, optionally about 1 to about 10 mol of styrene oxide and/or about 1 to about 10 mol of butylene oxide, b) about 0.1 to about 15.0 parts by weight of an inorganic or organic solid.

Examples of inorganic solids are unmodified or hydrophobicized silicas, metal soaps, alumina, alkaline earth metal carbonates, or similar, customary, finely divided solids known from the prior art. As finely divided organic substances it is possible to use alkaline earth metal salts of long-chain fatty acids of 12 to 22 carbon atoms that are known for this purpose, the amides of these acids, micronized waxes, or oligoureas produced in situ.

The formulations of the invention are used as they are or in the form of aqueous emulsions. The use of emulsions is preferred because of the better metering options. Particular preference is given to antifoam emulsions whose average particle size lies between about 1 and about 10 μm. Aqueous emulsions with a content of about 5 to about 50% of the formulations of the invention are particularly preferred.

The compound formulations of the invention are added to the polymer dispersions and aqueous coating systems in amounts of about 0.01 to about 3% by weight.

EXAMPLES

Examples of partial esters of oligoglycerides that are in accordance with the invention and are particularly suitable in the compound antifoams are:

a) The alkoxylation product of triglycerol trilaurate+30 mol of propylene oxide+3 mol of styrene oxide+3 mol of butylene oxide b) The alkoxylation product of pentaglycerol pentaoleate+ 50 mol of propylene oxide+5 mol of butylene oxide c) The alkoxylation product of pentaglycerol pentalaurate+50 mol of propylene oxide+5 mol of styrene oxide Compounds that are not in accordance with the invention but were investigated for purposes of comparison are:

d) The alkoxylation product of triglycerol trioleate+20 mol of propylene oxide+20 mol of ethylene oxide e) The alkoxylation product of pentaglycerol pentaoleate+ 30 mol of propylene oxide+5 mol of ethylene oxide f) Triglycerol triacetate g) Polypropylene glycol comprising 50 mol of propylene oxide.

These compounds in accordance and not in accordance with the invention are formulated with 3% of Sipernat D10 (hydrophobic silica from Degussa) in each case to give the respective compound antifoams A to G.

The text below indicates the performance properties of the various compound formulations of the invention and of the Comparative Examples.

The performance properties were tested in two commercially available polymer dispersions, an emulsion paint, and a water-based flexographic printing ink.

The test systems selected were as follows:

a. Styrene acrylate dispersion Acronal 290 D, from BASF b. All-acrylate dispersion Acronal A603, from BASF c. An emulsion paint is formulated conventionally to the recipe below (amounts in % by weight):

| | | |
|---|---|---|
| Propylene glycol | 4.8 | |
| Collacral AS35 | 5.0 | BASF, wetting and dispersing agent |
| Titanium dioxide | 23.2 | |
| Mergal K7 | 0.2 | Riedel de Haen, preservative |
| Butyl glycol | 2.6 | |
| Dowanol DPM | 1.4 | |
| Water | 6.9 | |
| Acronal A603 | 54.3 | BASF, all-acrylate dispersion |
| Rheolate 278 | 4.0 | Rheox, thickener | d. A flexographic printing ink is formulated conventionally to the following recipe (amounts in % by weight):
Millbase:

| | | |
|---|---|---|
| Joncryl 81 | 18.7 | acrylate resin solution, Johnson-Polymer |
| Foamex 840 | 0.1 | antifoam, Tego Chemie Service |
| Water | 7.5 | |
| Heliogenblau D7080 | 11.2 | phthalocyanine blue, BASF |
| 1 hour of dispersing (Apparatus: Scandex) | | |
| Make-up mixture: | | |
| Joncryl 8051 | 46.2 | acrylate dispersion, Johnson-Polymer |
| Jonwax 35 | 4.7 | polyethylene wax emulsion, Johnson-Polymer |
| Water | 6.8 | |
| Isopropanol | 4.7 | |

5 minutes of dispersing (Apparatus: Scandex)

As the last constituent of the recipe, 0.2% of the compound antifoams according and not according to the invention is added in each case and incorporated at 1000 rpm for one minute.

Foam test (for a. and b.)

By dispersion for 1 minute at 2,500 rpm using a turbine agitator (diameter 4 cm), air is incorporated into the polymer dispersions treated with 0.2% by weight of compound antifoam additive. Then, directly after the agitator has been shut off, the resulting dispersion is introduced into a measuring cylinder up to the 50 ml calibration mark, and is weighed. The weight is influenced by the amount of air incorporated by dispersion, and is a measure of the efficacy of the antifoam.

Foam test (for d.)

50 g of the aqueous flexographic printing ink, treated with 0.2% by weight of compound antifoam additive, are weighed out into a 150 ml glass beaker and subjected to shearing at 2,500 rpm for one minute using a dissolver disk (3 cm diameter). Then 45 g are weighed out into an upright cylinder, and the foam height is indicated in ml.

Roller test (for c.)

In the roller test, an open-pored foam roller is used to spread 40 g of the test emulsion paint onto a nonabsorbent test card with a total area of 500 cm$^2$. The foam roller is wetted with water before the paint is applied. In this context it is ensured that the same additional amount of water is introduced in each case into the paint, so that the drying time of the paint remains the same in each case. The wet film add-on is about 300 g/m$^2$. After the film has dried for 24 hours the test panels are evaluated in terms of the macrofoam (number of bubbles per 100 cm$^2$) and microfoam (number of pinholes, by comparison with test panels having defect patterns varying in their extent; scale from 1 (very good) to 5 (deficient, numerous pinholes)) present and for any wetting defects.

The following results demonstrate the broad applicability of the compound antifoams of the invention.

TABLE 1

Foam test results for styrene acrylate dispersion a

| Compound | Concentration | Sample density x g/50 ml |
| --- | --- | --- |
| Blank sample | 0 | 39.2 |
| A | 0.2 | 49.7 |
| B | 0.2 | 49.8 |
| C | 0.2 | 50.1 |
| D | 0.2 | 47.6 |
| E | 0.2 | 46.2 |
| F | 0.2 | 39.6 |
| F | 0.5 | 40.1 |
| G | 0.2 | 44.3 |
| G | 0.5 | 48.2 |

TABLE 2

Foam test results for styrene acrylate dispersion b

| Compound | Concentration | Sample density x g/50 ml |
| --- | --- | --- |
| Blank sample | 0 | 38 |
| A | 0.2 | 48.9 |
| B | 0.2 | 49.1 |
| C | 0.2 | 49.3 |
| D | 0.2 | 45.1 |
| E | 0.2 | 44.3 |
| F | 0.2 | 38.9 |
| F | 0.5 | 40.2 |
| G | 0.2 | 45.1 |
| G | 0.5 | 47.9 |

TABLE 3

Roller test results for emulsion paint c

| Compound | Concentration | Macrofoam | Microfoam | Wetting defects |
| --- | --- | --- | --- | --- |
| Blank Sample | 0 | 80 | 5 | none |
| A | 0.2 | 0 | 1 | none |
| B | 0.2 | 0 | 1 | none |
| C | 0.2 | 0 | 1 | none |
| D | 0.2 | 5 | 2 | none |
| E | 0.2 | 7 | 3 | slight |
| F | 0.2 | 72 | 5 | none |
| F | 0.5 | 65 | 5 | none |
| G | 0.2 | 10 | 2 | none |
| G | 0.5 | 3 | 2 | slight |

TABLE 4

Foam test results for flexographic printing ink d

| Compound | Concentration | Foam level in ml/45 g |
| --- | --- | --- |
| Blank sample | 0 | 62 |
| A | 0.2 | 46 |
| B | 0.2 | 47 |
| C | 0.2 | 45 |
| D | 0.2 | 52 |
| E | 0.2 | 50 |
| F | 0.2 | 62 |
| F | 0.5 | 65 |
| G | 0.2 | 53 |
| G | 0.5 | 49 |

The above description of the invention is intended to be illustrated and not limiting. Various changes or modifications in the embodiments described may occur to those skilled in the art. These can be made without departing from the spirit or scope of the invention.

What is claimed is:

1. An antifoam formulation for defoaming polymer dispersions and aqueous coating systems, comprising
   a) about 85.0 to about 99.9 parts by weight of an alkoxylated partial ester of an oligo-glycerol which was esterified with $C_8$ to $C_{22}$ fatty acids and alkoxylated with about 3 to about 60 mol of propylene oxide and optionally with about 1 to about 10 mol of styrene oxide optionally about 1 to about 10 mol of butylene oxide, and
   b) about 0.1 to about 15.0 parts by weight of an inorganic or organic solid.

2. A formulation as claimed in claim 1, wherein the partial esters are formed from the esterification of oligoglycerols, obtained by the condensation of 3 to 8 glycerol molecules, with $C_8$ to $C_{22}$ fatty acids.

3. The formulation as claimed in claim 2, wherein the partial esters are formed from the esterification of oligoglycerols, obtained by the condensation of 4 to 6 glycerol molecules with caprylic, capric, laurylic, myristic, palmitic, stearic, isosteric, oleric, ricnoleric and 12-hydroxysteric acid.

4. A formulation as claimed in claim 1, wherein the alkoxylated partial ester is alkoxylated with about 10 to about 30 mol of propylene oxide and about 1 to about 10 mol of styrene oxide and about 1 to about 10 mol of butylene oxide.

5. A formulation as claimed in claim 1, wherein the alkoxylated partial ester of an oligoglycerol is obtained by the alkoxylation product of triglycerol trilaurate, 30 mol of propylene oxide, and 3 mol of butylene oxide.

6. A formulation as claimed in claim 1, wherein the alkoxylated partial ester of an oligoglycerol is obtained by the alkoxylation product of pentaglycerol pentoleate, 50 mol of propylene oxide and 5 mol of butylene oxide.

7. A formulation as claimed in claim 1, wherein the alkoxylated partial ester of an oligoglycerol is obtained by the alkoxylation product of pentaglycerol pentalaurate, 50 mol of propylene oxide and 5 mol of styrene oxide.

8. An aqueous emulsion which comprises the antifoam formulation according to claim 1.

9. The emulsion according to claim 8, wherein the average droplet size of the emulsion lies between about 1 and about 10 $\mu$m.

10. An aqueous emulsion which comprises the antifoam formulation according to claim 1, wherein the partial esters in said formulation are formed from the esterification of oligoglycerols, obtained by the condensation of 3 to 8 glycerol molecules, with $C_8$ to $C_{22}$ fatty acids.

11. An aqueous formulation which comprises about 5 to about 50% of the formulation according to claim 1.

12. An antifoam formulation for defoaming polymer dispersions and aqueous coating systems, comprising a) 85.0 to 99.9 parts by weight of an alkoxylated partial ester of an oligo-glycerol which was esterified with $C_8$ to $C_{22}$ fatty acids and alkoxylated with 3 to 60 mol of propylene oxide and optionally with 1 to 10 mol of styrene oxide and optionally 1 to 10 mol of butylene oxide, and b) 0.1 to 15.0 parts by weight of an inorganic or organic solid.

* * * * *